United States Patent [19]

Yoshida

[11] Patent Number: 5,134,634
[45] Date of Patent: Jul. 28, 1992

[54] MULTILEVEL QUADRATURE AMPLITUDE DEMODULATOR CAPABLE OF COMPENSATING FOR A QUADRATURE PHASE DEVIATION OF A CARRIER SIGNAL PAIR

[75] Inventor: Yasuharu Yoshida, Tokyo, Japan
[73] Assignee: NEC Corporation, Tokyo, Japan
[21] Appl. No.: 575,136
[22] Filed: Aug. 29, 1990

[30] Foreign Application Priority Data

Aug. 31, 1989 [JP] Japan .................. 1-225703

[51] Int. Cl.$^5$ .................. H04L 27/14
[52] U.S. Cl. .................. 375/80; 329/304
[58] Field of Search .............. 375/39, 80, 82, 83, 375/102; 329/304, 308, 310, 345, 346; 370/12; 455/42, 60, 295, 296

[56] References Cited

U.S. PATENT DOCUMENTS

| | | | |
|---|---|---|---|
| 4,085,378 | 4/1978 | Ryan et al. | 329/308 |
| 4,344,178 | 8/1982 | Waters | 329/308 |
| 4,833,416 | 5/1989 | Attwood | 329/304 |
| 4,871,974 | 10/1989 | Davis et al. | 329/304 |
| 4,993,047 | 2/1991 | Moffatt et al. | 375/102 |

FOREIGN PATENT DOCUMENTS 57-131151 8/1982 Japan .
1-158854 6/1989 Japan .

Primary Examiner—Stephen Chin
Attorney, Agent, or Firm—Laff, Whitesel, Conte & Saret

[57] ABSTRACT

In a demodulator for demodulating a multilevel quadrature amplitude modulated signal into inphase and quadrature demodulated signals (ID) and (QD), a processing unit (10) processes the multilevel quadrature amplitude modulated signal to produce inphase and quadrature processed signals (IDS) and (QDS). An inphase phase controller (20) is supplied with an inphase control signal and the inphase and the quadrature processed signals and produces an inphase phase controlled signal as the inphase demodulated signal. The inphase demodulated signal comprises an inphase data signal and an inphase error signal. A quadrature phase controller (21) is supplied with a quadrature control signal and the inphase and the quadrature processed signals and produces a quadrature phase controlled signal as the quadrature demodulated signal. The quadrature demodulated signal comprises a quadrature data signal and a quadrature error signal. An inphase multiplier (22) multiplies the inphase error signal by the quadrature data signal and produces an inphase multiplied signal as the inphase control signal. A quadrature multiplier (23) multiplies the quadrature error signal by the inphase data signal and produces a quadrature multiplied signal as the quadrature control signal.

6 Claims, 5 Drawing Sheets

MULTILEVEL QUADRATURE AMPLITUDE DEMODULATOR CAPABLE OF COMPENSATING FOR A QUADRATURE PHASE DEVIATION OF A CARRIER SIGNAL PAIR

BACKGROUND OF THE INVENTION

This invention relates to a multilevel quadrature amplitude demodulator for use as a counterpart of a multilevel quadrature amplitude modulator for modulating a main data signal into a multilevel quadrature amplitude modulated signal. Such a demodulator is particularly useful in an LSI (large scale integration circuit) modem for a digital communication system.

In the digital communication system, the multilevel quadrature amplitude modulator is used in effectively utilizing a radio frequency band as known in the art. The multilevel quadrature amplitude modulator modulates a pair of quadrature phase carrier signals by a main data signal into a multilevel quadrature amplitude modulated signal. A transmitter is supplied with the multilevel quadrature amplitude modulated signal and frequency converts the multilevel quadrature amplitude modulated signal into a radio frequency signal of a microwave band to transmit the radio frequency signal through a transmission path.

A receiver receives the radio frequency signal through the transmission path and frequency converts the radio frequency signal into the multilevel quadrature amplitude modulated signal of an intermediate frequency band.

The multilevel quadrature amplitude demodulator is supplied with the quadrature amplitude modulated signal as a demodulator input signal having an input signal phase. The multilevel quadrature amplitude demodulator comprises a processing unit and a phase control circuit. The processing unit processes the demodulator input signal for producing inphase and quadrature processed signals. The inphase and the quadrature processed signals have inphase and quadrature signal phases, respectively. The processing unit comprises a quadrature phase detector. The quadrature phase detector carries out phase detection of the demodulator input signal by using first and second local carrier signals each of which has a constant frequency and produces inphase and quadrature baseband signals. The second local carrier signal has a quadrature phase difference relative to the first local carrier signal. Each of the inphase and the quadrature baseband signals is supplied to the phase control circuit through a low-pass filter, an analog-to-digital converter, and a digital filter as will later be described more in detail.

The phase control circuit controls the inphase and the quadrature signal phases so that each of the inphase and the quadrature signal phases coincides with the input signal phase. The phase control circuit reproduces inphase and quadrature demodulated signals at a certain code error rate.

If a quadrature phase deviation, namely, a phase deviation in orthogonality, occurs between the first and the second local carrier signals, the code error rate is seriously deteriorated. The quadrature phase deviation is caused by performance of the quadrature phase detector. This is because the quadrature phase detector is influenced by aged deterioration and a variation in ambient temperature. The quadrature phase deviation should be kept as little as possible. It is therefore desirable to design exactly for the quadrature phase detector so as to reduce influence of the aged deterioration and the variation in ambient temperature. Such an exact design is, however, objectionable because the quadrature phase detector becomes expensive.

SUMMARY OF THE INVENTION

It is therefore an object of this invention to provide a multilevel quadrature amplitude demodulator capable of compensating for a quadrature phase deviation caused by a quadrature phase detector.

It is another object of this invention to provide a multilevel amplitude demodulator of the type described which can be implemented by an LSI.

Other objects of this invention will become clear as the description proceeds.

On describing the gist of this invention, it is possible to understand that a demodulator is for use as a counterpart of a multilevel quadrature amplitude modulator for modulating a main data signal into a multilevel quadrature amplitude modulated signal. The demodulator is for demodulating the multilevel quadrature amplitude modulated signal into an inphase demodulated signal and a quadrature demodulated signal. The demodulator comprises a processing unit supplied with the multilevel quadrature amplitude modulated signal for processing the multilevel quadrature amplitude modulated signal into inphase and quadrature processed signals. The inphase processed signal has an inphase signal phase while the quadrature processed signal has a quadrature signal phase.

According to this invention, the above-understood demodulator further comprises an inphase phase controller supplied with the inphase and the quadrature processed signals and an inphase control signal for controlling the inphase signal phase to produce an inphase phase controlled signal as the inphase demodulated signal and a quadrature phase controller supplied with the inphase and the quadrature processed signals and a quadrature control signal for controlling the quadrature signal phase to produce a quadrature phase controlled signal as the quadrature demodulated signal. The inphase phase controlled signal comprises an inphase data signal and an inphase error signal while the quadrature phase controlled signal comprises a quadrature data signal and a quadrature error signal. The demodulator still further comprises a first multiplier connected to the inphase and the quadrature phase controllers for multiplying the inphase error signal by said quadrature data signal to supply a first multiplied signal to the inphase phase controller as the inphase control signal, and a second multiplier connected to the inphase and the quadrature phase controllers for multiplying the quadrature error signal by the inphase data signal to supply a second multiplied signal to the quadrature phase controller as the quadrature control signal.

DESCRIPTION OF THE PREFERRED EMBODIMENT

Figure 1:
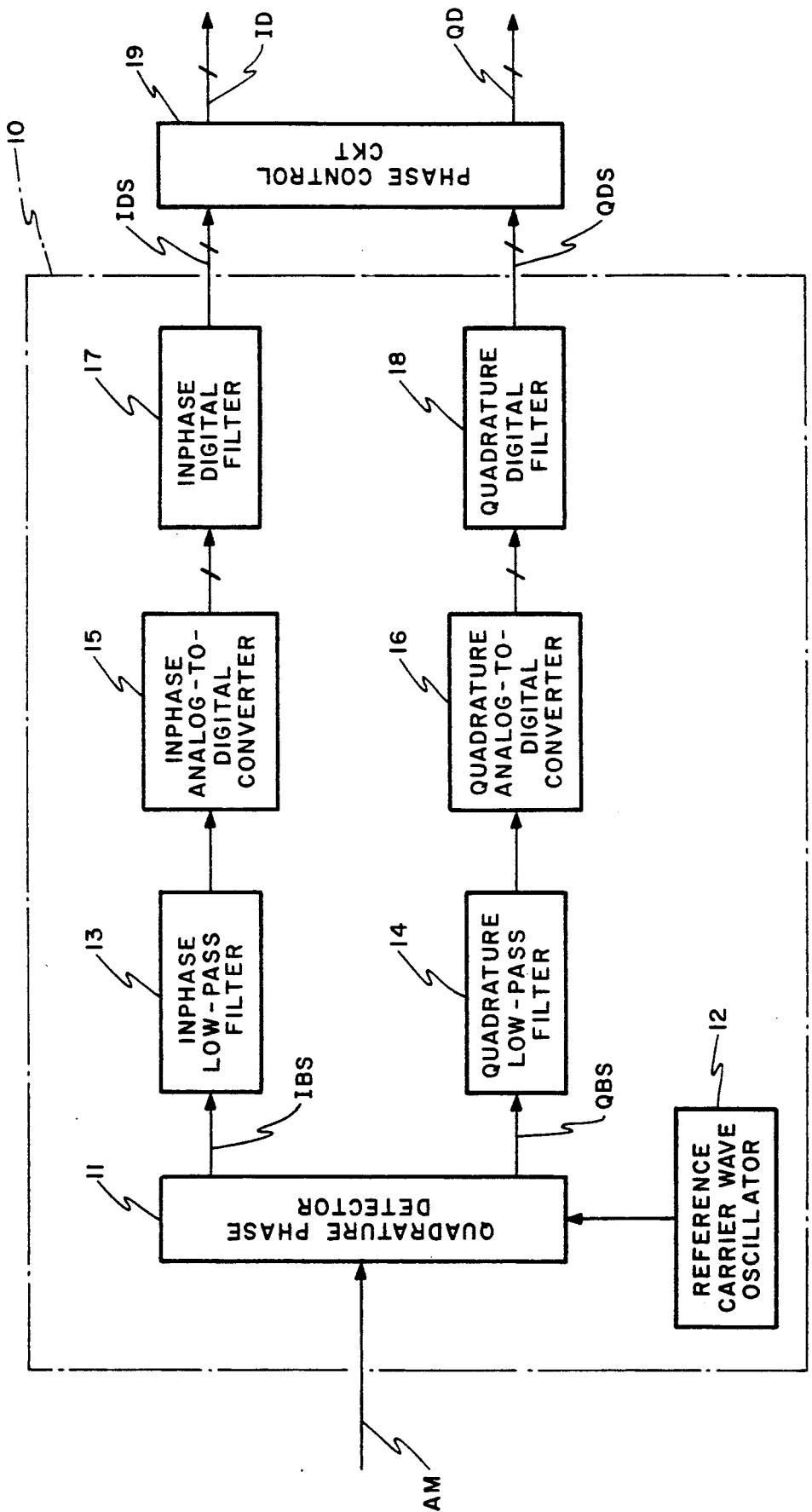
FIG. 1 is a block diagram of a conventional multilevel quadrature amplitude demodulator.

Referring to FIG. 1, a conventional multilevel quadrature amplitude demodulator will be described at first in order to facilitate an understanding of the present invention. The conventional multilevel quadrature amplitude demodulator is of the type disclosed in Japanese Unexamined Patent Prepublication No. Hei 1-158854, namely, 158854/1989. The conventional multilevel quadrature amplitude demodulator is for use as a counterpart of a multilevel quadrature amplitude modulator for amplitude modulating a pair of quadrature phase carrier signals by a main data signal into a multilevel quadrature amplitude modulated signal. When the main data signal is an 2 n-bit binary signal, where n is a predetermined number, the main data signal can have $2^{2n}$ signal values. The multilevel quadrature amplitude modulated signal has $2^{2n}$ output signal points on a phase plane which has an origin and real and imaginary axes orthogonally crossing at the origin. In order to produce the pair of quadrature phase carrier signals, the multilevel quadrature amplitude modulator comprises a modulator oscillator and a $\pi/2$ modulator phase shifter which are well known in the art and are not shown. The multilevel quadrature amplitude modulated signal is supplied to a transmitter (not shown). The transmitter carries out frequency conversion of the multilevel quadrature amplitude modulated signal to produce a radio frequency signal of a microwave band. The transmitter transmits the radio frequency signal through a transmission path (not shown).

A receiver (not shown) receives the radio frequency signal through the transmission path and carries out frequency conversion of the radio frequency signal to produce the multilevel quadrature amplitude modulated signal of an intermediate frequency band. The conventional multilevel quadrature amplitude demodulator is supplied with the multilevel quadrature amplitude modulated signal as a demodulator input signal AM having an input signal phase. The demodulator input signal has $2^{2n}$ reception signal points which are in one-to-one correspondence to the output signal points of the multilevel quadrature amplitude modulated signal. The demodulator demodulates the demodulator input signal AM into inphase and quadrature demodulated signals ID and QD. The demodulator comprises a processing unit 10 for processing the demodulator input signal AM to produce inphase and quadrature processed signals IDS and QDS.

The processing unit 10 comprises a quadrature phase detector 11 supplied with the demodulator input signal AM. The quadrature phase detector 11 carries out phase detection of the demodulator input signal AM by using first and second local carrier signals. In order to produce the first and the second local carrier signals, the quadrature phase detector 11 comprises a $\pi/2$ phase shifter (not shown). The $\pi/2$ phase shifter is supplied with a reference carrier signal of a constant frequency from a reference carrier wave oscillator 12 and produces the first local carrier signal and the second local carrier signal having a quadrature phase difference relative to the first local carrier signal. The demodulator input signal AM has a phase deviation of $\phi$ radian relative to the reference carrier signal.

As a result of the phase detection, the quadrature phase detector 11 supplies inphase and quadrature baseband signals IBS and QBS to inphase and quadrature low-pass filters 13 and 14. The inphase baseband signal has an inphase signal level which can have one of $2^{2n/2}$ levels that depends on the input signal phase. Likewise, the quadrature baseband signal has a quadrature signal level which can have one of $2^{2n/2}$ levels that depends on the input signal phase. The inphase and the quadrature low-pass filters 13 and 14 delivers inphase and quadrature filtered signals to inphase and quadrature analog-to-digital converters 15 and 16, respectively. Each of the inphase and the quadrature analog-to-digital converters 15 and 16 serves as a multilevel decision unit known in the art. The inphase and the quadrature analog-to-digital converters 15 and 16 deliver inphase and quadrature converted signals to inphase and quadrature digital filters 17 and 18, respectively. Each of the inphase and the quadrature digital filters 17 and 18 carries out digital filtering of the inphase and the quadrature converted signals in a manner which is called a rolloff shaping. As a result of the digital filtering, the inphase digital filter 17 produces an inphase digital filtered signal as the inphase processed signal IDS. Likewise, the quadrature digital filter 18 produces a quadrature digital filtered signal as the quadrature processed signal QDS. The inphase and the quadrature processed signals IDS and QDS have inphase and quadrature signal phases, respectively. A phase control circuit 19 controls the inphase and the quadrature signal phases in the following manners.

Figure 2:
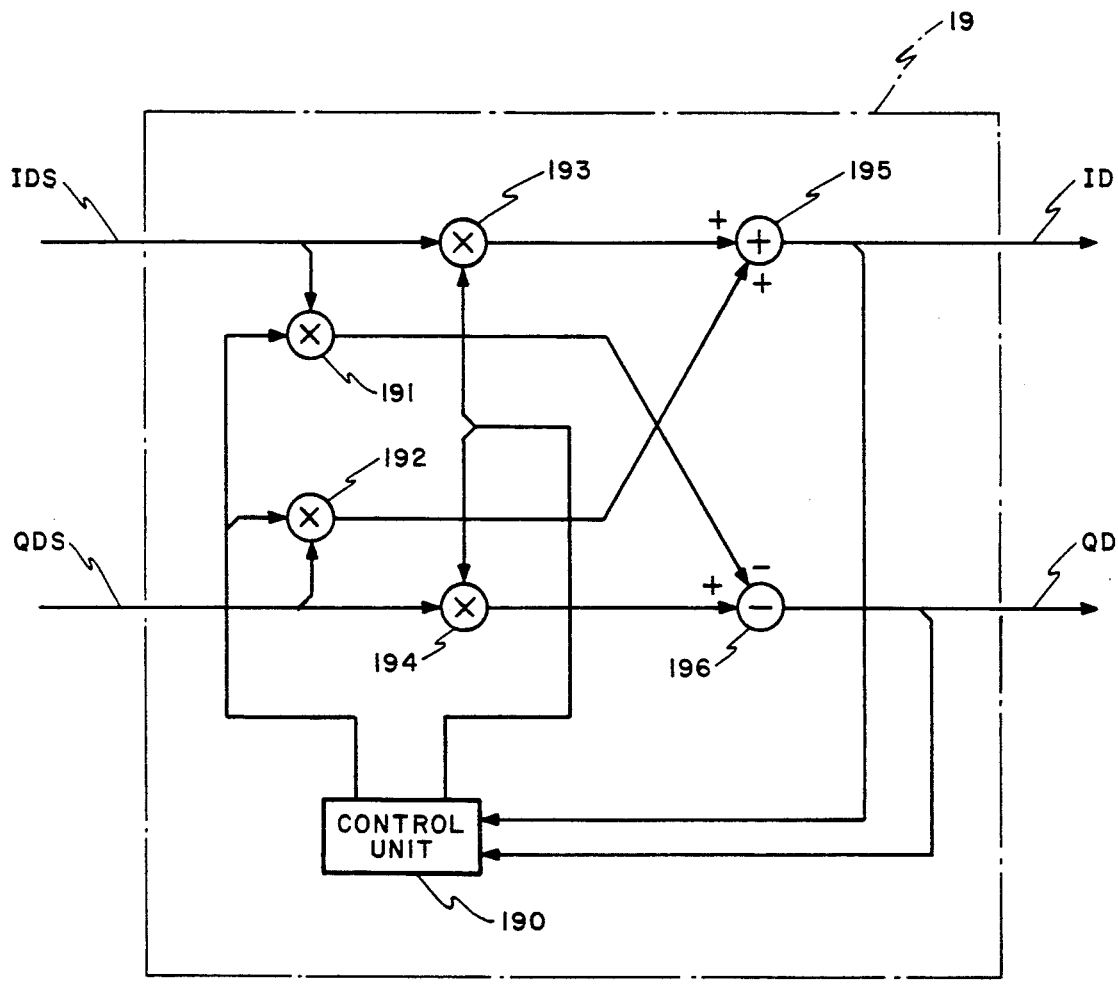
FIG. 2 is a block diagram of a phase control circuit illustrated in FIG. 1.

Referring to FIG. 2, the description will proceed to the phase control circuit 19. Let each of the inphase and the quadrature processed signals IDS and QDS have the phase deviation $\phi$. The phase control circuit 19 is for phase rotating the inphase and the quadrature processed signals IDS and QDS on the phase plane around the origin by detecting the phase deviation $\phi$.

The phase control circuit 19 comprises a control unit 190 supplied with the inphase and the quadrature demodulated signals ID and QD. As described in detail in the above-referenced Japanese Unexamined Patent Prepublication, the control unit 190 detects the phase deviation $\phi$ and produces first and second control signals each of which represents sin $\phi$ and cos $\phi$. A first multiplier 191 is supplied with the first control signal and the inphase processed signal IDS. The first multiplier 191 calculates a first product of the sin $\phi$ and the inphase signal level and produces a first product signal representative of the first product. A second multiplier 192 is supplied with the first control signal and the quadrature processed signal QDS. The second multiplier 192 calculates a second product of the sin $\phi$ and the quadrature signal level and produces a second product signal representative of the second product. A third multiplier 193 is supplied with the second control signal and the inphase processed signal IDS. The third multiplier 193 calculates a third product of the cos $\phi$ and the inphase signal level and produces a third product signal representative of the third product. A fourth multiplier 194 is supplied with the second control signal and the quadrature processed signal QDS. The fourth multiplier 194 calculates a fourth product of the cos $\phi$ and the quadrature signal level and produces a fourth product signal representative of the fourth product.

Supplied with the second and the third product signals, an adder 195 calculates a sum of the second and the third products and produces a sum signal representative of the sum. Supplied with the first and the fourth product signals, a subtracter 196 calculates a difference between the first and the fourth products and produces a difference signal representative of the difference. As a result of the above-mentioned calculation, each of the inphase and the quadrature demodulated signals ID and QD has inphase and quadrature controlled phases each of which coincides with the input signal phase. Thus, the phase control circuit 19 can get rid of the phase deviation $\phi$ and reproduces the inphase and the quadrature demodulated signals ID and QD at a certain code error rate.

In order to reduce the cost and the size of the demodulator and to stabilize performance of the demodulator, each of the phase control circuit 19 and a combination of the inphase and the quadrature analog-to-digital converters 15 and 16 and the inphase and the quadrature digital filters 17 and 18 is implemented by an LSI. Such a demodulator may be called an LSI demodulator.

If a quadrature phase deviation of $\alpha$ radian, namely, a phase deviation $\alpha$ in orthogonality, occurs between the first and the second local carrier signals, the code error rate is seriously deteriorated. The quadrature phase deviation $\alpha$ is caused by performance of the $\pi/2$ phase shifter in the quadrature phase detector 11. This is because the $\pi/2$ phase shifter is influenced by aged deterioration and a variation in ambient temperature. Such a problem applies to the $\pi/2$ modulator phase shifter in the multilevel quadrature amplitude modulator. The phase control circuit 19 can not get rid of the quadrature phase deviation $\alpha$. It is therefore required to exactly design the $\pi/2$ phase shifter so as to reduce influences of the aged deterioration and the variation in ambient temperature. Such an exact design is, however, objectionable because the LSI demodulator becomes expensive.

Figure 3:
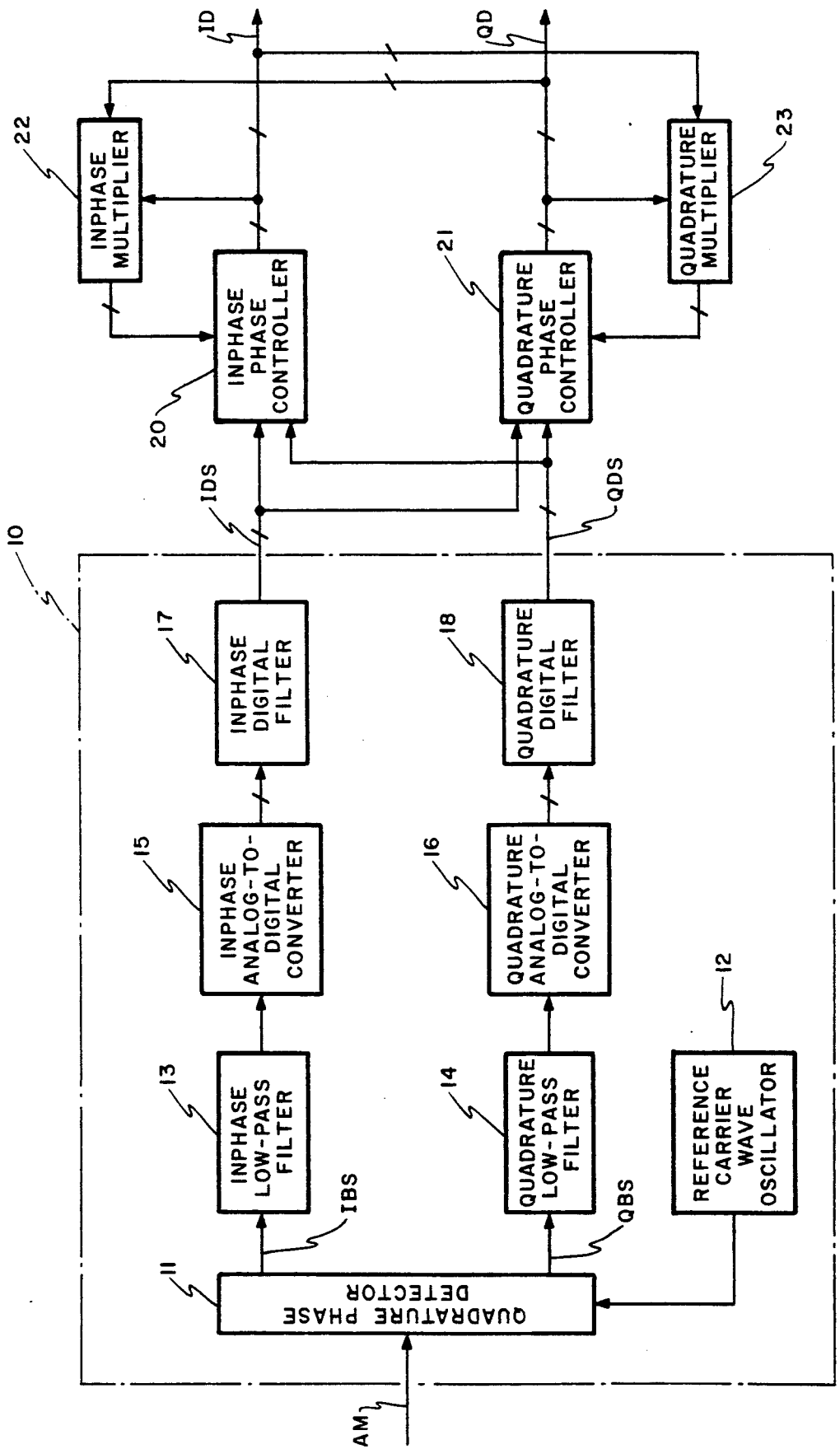
FIG. 3 is a block diagram of a multilevel quadrature amplitude demodulator according to an embodiment of this invention.

Referring to FIG. 3, the description will proceed to a multilevel quadrature amplitude demodulator according to a preferred embodiment of this invention. The demodulator is of the plesiochronous type. The demodulator comprises a processing unit 10 which is similar to that illustrated with reference to FIG. 1 and is therefore designated by the reference numeral 10. Let the demodulator input signal AM have a phase difference of $\theta$ radian relative to the reference carrier signal. It will be assumed that the inphase and the quadrature processed signals IDS and QDS represent an inphase signal phase factor of $\sin \theta$ and a quadrature signal phase factor of $\cos \theta$, respectively.

The demodulator comprises inphase and quadrature phase controllers 20 and 21 and inphase and quadrature multipliers 22 and 23. As will later be described, the inphase phase controller 20 is for shifting the inphase signal phase from $\theta$ radian to $(\theta+\beta)$ radian where $\beta$ represents an inphase shift phase. Similarly, the quadrature phase controller 21 is for shifting the quadrature signal phase from $\theta$ radian to $(\theta-\gamma)$ radian where $\gamma$ represents a quadrature shift phase. Each of the inphase and the quadrature phase controllers 20 and 21 can be implemented by an infinite phase shifter of a digital type which is known in the art and which is suitably implemented by an LSI. The inphase phase controller 20 is supplied with the inphase and the quadrature processed signals IDS and QDS and and an inphase control signal produced by an inphase multiplier 22. Similarly, the quadrature phase controller 21 is supplied with the inphase and the quadrature processed signals IDS and QDS and a quadrature control signal produced by a quadrature multiplier 23.

In the manner which will shortly be described more in detail, the inphase phase controller 20 produces an inphase phase controlled signal as the inphase demodulated signal ID. Likewise, the quadrature phase controller 21 produces a quadrature phase controlled signal as the quadrature demodulated signal QD. Each of the inphase and the quadrature demodulated signals ID and QD has (n+x) bits, where x represents a natural number. Each of the inphase and the quadrature demodulated signals ID and QD is therefore numbered from a first bit (most significant bit) to an (n+x)-th bit (least significant bit). The inphase demodulated signal ID comprises an inphase data signal represented by the first through the n-th bits and an inphase error signal represented by (n+1)-th through the (n+x)-th bits. Similarly, the quadrature demodulated signal QD comprises a quadrature data signal represented by the first through the n-th bits and a quadrature error signal represented by (n+1)-th through the (n+x)-th bits.

As disclosed in Japanese Unexamined Patent Prepublication No. Syo 57-131151, or otherwise known as 131151/1982, the reception signal points of the demodulator input signal AM inevitably have positional deviation, namely, the phase deviation or error, deviated from the respective positions of the output signal points of the multilevel quadrature amplitude modulated signal. Each of the inphase and the quadrature error signals generally represents the positional deviation. Based on the principle described in the above-mentioned Japanese Unexamined Patent Prepublication, the inphase and the quadrature multipliers 22 and 23 produce the inphase and the quadrature control signals, respectively.

Supplied with the inphase error signal and the quadrature data signal, the inphase multiplier 22 multiplies the inphase error signal by the quadrature data signal and produces an inphase multiplied signal as the inphase control signal. Supplied with the quadrature error signal and the inphase data signal, the quadrature multiplier 23 multiplies the quadrature error signal by the inphase data signal and produces a quadrature multiplied signal as the quadrature control signal.

Supplied with the inphase control signal, the inphase phase controller 20 operates so as to give a minimum value to the inphase error signal. Similarly, the quadrature phase controller 21 is supplied with the quadrature control signal and operates so as to give a minimum value to the quadrature error signal.

Figure 4:
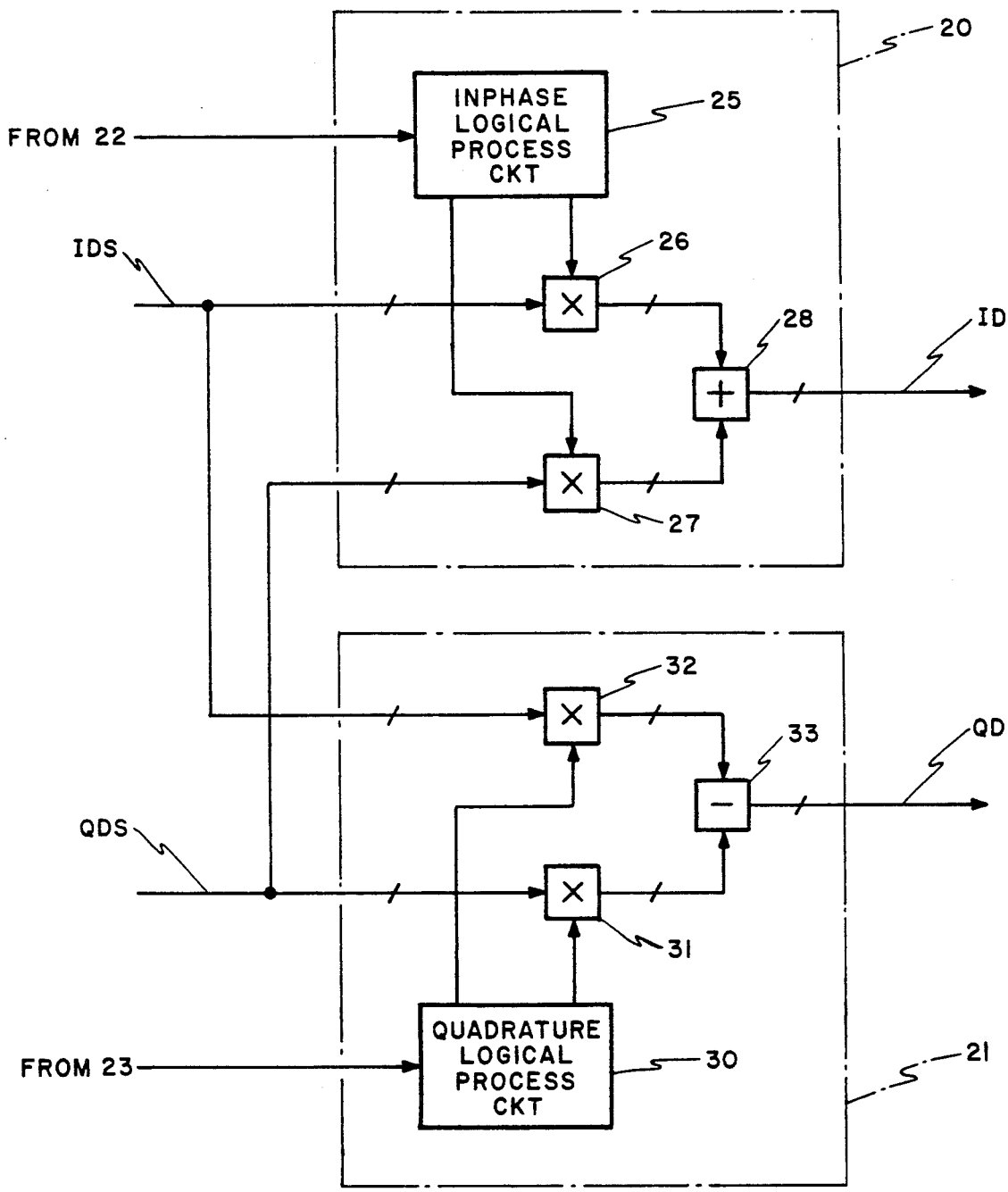
FIG. 4 is a block diagram of an inphase and quadrature phase controllers illustrated in FIG. 3.

Referring to FIG. 4, the description will proceed to the inphase and the quadrature phase controllers 20 and 21. The inphase phase controller 20 comprises an inphase logical process circuit 25 supplied with the inphase control signal. As will later be described, the inphase logical process circuit 25 produces first and second inphase function signals each of which represents first and second variable inphase values given by $\cos \beta$ and $\sin \beta$. A first inphase multiplier 26 is supplied with the inphase processed signal IDS and the first inphase function signal. The first inphase multiplier 26 multiplies $\sin \theta$ by $\cos \beta$ into a first inphase multiplied value and produces a first inphase multiplied signal representative of the first inphase multiplied value given by $\sin \theta \cdot \cos \beta$. In other words, the first inphase multiplier 26 calculates a first inphase product of $\sin \theta$ and cos $\beta$ to produce the first inphase multiplied signal representative of the first inphase product as the first inphase multiplied value. Likewise, a second inphase multiplier 27 is supplied with the quadrature processed signal QDS and the second inphase function signal. The second inphase multiplier 27 multiplies cos $\theta$ by sin $\beta$ into a second inphase multiplied value and produces a second inphase multiplied signal representative of the second inphase multiplied value given by cos $\theta$·sin $\beta$.

The first and the second inphase multiplied signals are supplied to an inphase adder 28. The inphase adder 28 calculates an inphase sum of the first and the second inphase multiplied values and produces, as the inphase phase controlled signal, an inphase sum signal representative of the inphase sum given by (sin $\theta$·cos $\beta$+cos $\theta$·sin $\beta$). It is to be noted here that the inphase sum is equal to sin ($\theta$+$\beta$) and that the inphase phase controlled signal has an inphase controlled phase of ($\theta$+$\beta$) radian. This means that the inphase controlled phase is variable by supplying the first and the second variable inphase values of cos $\beta$ and sin $\beta$ to the first and the second inphase multipliers 26 and 27, respectively.

The above-mentioned description applies to the quadrature phase controller 21. The quadrature phase controller 21 comprises a quadrature logical process circuit 30, first and second quadrature multipliers 31 and 32, and a quadrature subtracter 33. As will later be described, the quadrature logical process circuit 30 produces first and second quadrature function signals each of which represents first and second variable quadrature values given by cos $\gamma$ and sin $\gamma$, respectively. The first quadrature multiplier 31 multiplies cos $\theta$ by cos $\gamma$ into a first quadrature multiplied value and produces a first quadrature multiplied signal representative of the first quadrature multiplied value given by cos $\theta$·cos $\gamma$. Likewise, the second quadrature multiplier 32 multiplies sin $\theta$ by sin $\gamma$ and produces a second quadrature multiplied signal representative of the second quadrature multiplied value given by sin $\theta$·sin $\gamma$. The first and the second quadrature multiplied signals are supplied to the quadrature subtracter 33. The quadrature subtracter 33 calculates a quadrature difference between the first and the second quadrature multiplied values and produces, as the quadrature phase controlled signal, a quadrature difference signal representative of the quadrature difference given by (cos $\theta$·cos $\gamma$−sin $\theta$·sin $\gamma$). The quadrature difference is equal to cos ($\theta$−$\gamma$). The quadrature phase controlled signal has a quadrature controlled phase of ($\theta$−$\gamma$) radian. This means that the quadrature controlled phase is variable by supplying the first and the second variable quadrature values of cos $\gamma$ and sin $\gamma$ to the first and the second quadrature multipliers 31 and 32, respectively.

By the way, the phase difference $\theta$ is given by $(m+2\pi\Delta ft)$ where m represents a modulation phase component and where $\Delta f$ represents a frequency difference between an input frequency of the demodulator input signal AM and a frequency of the reference carrier signal. Let the quadrature processed signal QDS have the quadrature phase deviation $\alpha$. In this event, the inphase phase control signal has the inphase controlled phase given by $(m+2\pi\Delta ft+\beta)$ while the quadrature phase controlled signal has the quadrature controlled phase given by $(m+2\pi\Delta ft-\alpha-\gamma)$. The inphase phase controller 20 operates so that the inphase shift phase becomes equal to $-2\pi\Delta ft$. The quadrature phase controller 21 operates so that the quadrature shift phase becomes equal to $(\alpha+2\pi\Delta ft)$. Thus, the inphase and the quadrature phase controllers 20 and 21 can reproduce the inphase and the quadrature demodulated signals ID and QD each of which represents sin (m) and cos (m), respectively.

In other words, each of the inphase and the quadrature phase controllers 20 and 21 operates independently so that each of the inphase and the quadrature error signals has a minimum value. This means that the inphase and the quadrature phase controllers 20 and 21 can compensate for the quadrature phase deviation $\alpha$.

Although the inphase multiplier 22 is supplied with the (n+1)-th through the (n+x)-th bits of the inphase demodulated signal and the first through the n-th bits of the quadrature demodulated signal, the inphase multiplier 22 may be supplied with only the (n+1)-th bit of the inphase demodulated signal and only the first bit of the quadrature demodulated signal. The reason is disclosed in the above-referenced Japanese Unexamined Patent Prepublication. The above-mentioned description applies to the quadrature multiplier 23.

Figure 5:
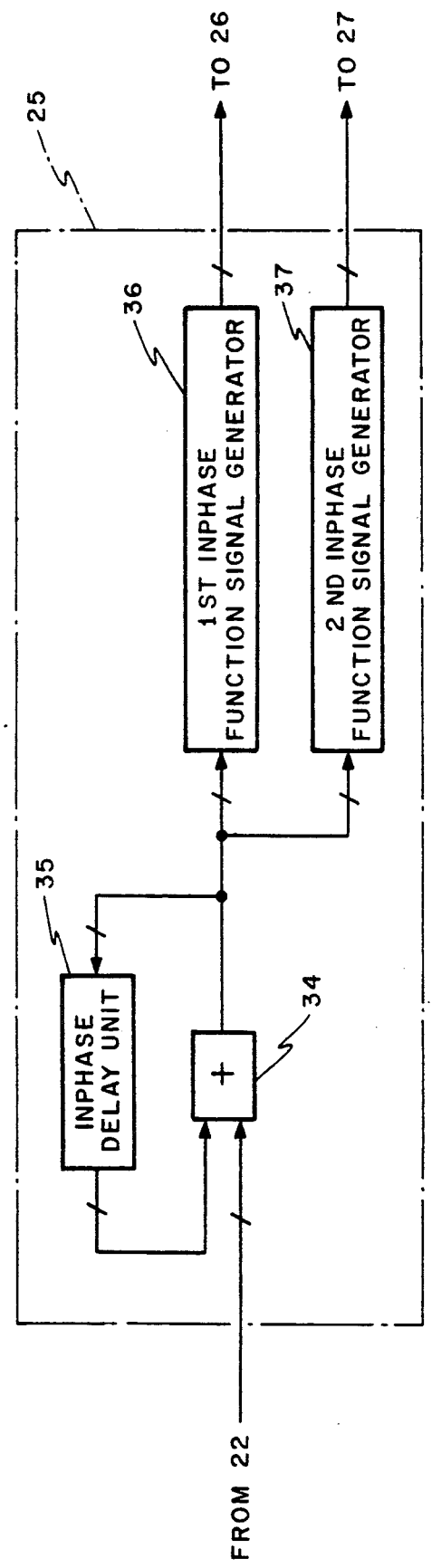
FIG. 5 is a block diagram of an inphase logical process circuit illustrated in FIG. 4.

Referring to FIG. 5, the description will proceed to the inphase logical process circuit 25. The inphase logical process circuit 25 comprises an additional inphase adder 34 supplied with an inphase delayed signal and the inphase control signal. The additional inphase adder 34 calculates an inphase accumulation of the inphase delayed signal and the inphase control signal and produces an inphase accumulated signal representative of the inphase accumulation in each of a sequence of time slots. A little more in detail, the inphase accumulated signal consists of a plurality of bits in the time slot. An inphase delay unit 35 is supplied with the inphase accumulated signal and gives a delay of one time slot to the inphase accumulated signal to produce the inphase delayed signal. A first inphase function signal generator 36 is supplied with the inphase accumulated signal and produces a first inphase signal as the first inphase function signal representative of the first variable inphase value given by cos $\beta$. A second inphase function signal generator 37 is supplied with the inphase accumulated signal and produces a second inphase signal as the second inphase function signal representative of the second variable inphase value given by sin $\beta$.

Each of the first and the second inphase function signal generators 36 and 37 is implemented by an ROM (read only memory). If the inphase accumulated signal consists of eight bits, the first inphase function signal generator 36 preliminarily memorizes first through 256-th first variable inphase values obtained by equally dividing a range between sin 0 and sin $2\pi$ by a factor of 256. The above-described description applies to the second inphase function signal generator 37.

Under the circumstances, it is understood that the inphase logical process circuit 23 serves as a voltage controlled oscillator. If the inphase processed signal IDS has the quadrature phase deviation $\alpha$, the inphase control signal has a certain value. As a result, the inphase accumulation of the inphase accumulated signal increases at a speed corresponding to a value of the quadrature phase deviation $\alpha$. Consequently, the first and the second inphase multipliers 26 and 27 independently carry out phase rotation of the inphase and the quadrature processed signals at the speed described above by using the first and the second inphase function signals, respectively. As a result of the phase rotation, the inphase phase controller 20 operates so that the inphase error signal has a minimum value and can get rid of the quadrature phase deviation $\alpha$.

The above-mentioned description applies to the quadrature logical process circuit 30.

Figure 6:
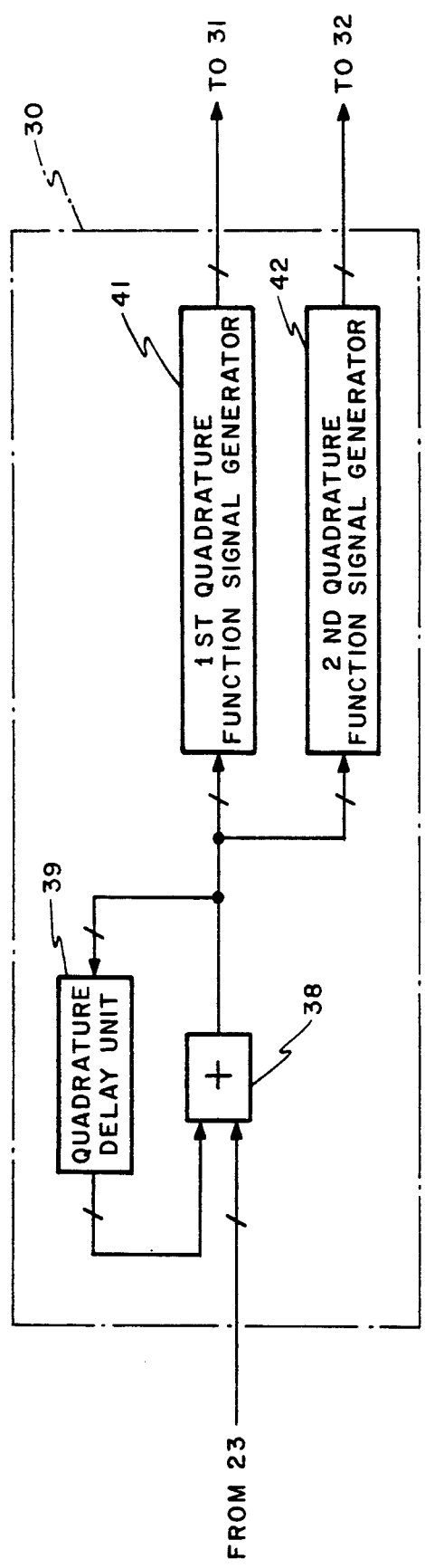
FIG. 6 is a block diagram of a quadrature logical process circuit illustrated in FIG. 4.

Referring to FIG. 6, the quadrature logical process circuit 30 comprises an additional quadrature adder 38 supplied with a quadrature delayed signal and the quadrature control signal. The additional quadrature adder 38 calculates a quadrature accumulation of the quadrature delayed signal and the quadrature control signal and produces a quadrature accumulated signal representative of the quadrature accumulation. The quadrature accumulated signal consists of a plurality of bits in the time slot. A quadrature delay unit 39 is supplied with the quadrature accumulated signal and gives a delay of one time slot to the quadrature accumulated signal to produce the quadrature delayed signal. A first quadrature function signal generator 41 is supplied with the quadrature accumulated signal and produces a first quadrature signal as the first quadrature function signal representative of the first variable quadrature value given by cos $\gamma$. A second quadrature function signal generator 42 is supplied with the quadrature accumulated signal and produces a second quadrature signal as the second quadrature function signal representative of the second variable quadrature value given by sin $\gamma$.

While this invention has thus far been described in conjunction with a preferred embodiment thereof, it will readily be possible for those skilled in the art to put this invention into practice in various other manners. For example, each of the inphase and the quadrature phase controllers 20 and 21 may be implemented by the infinite phase shifter of an analog type. In this event, each of the inphase and the quadrature phase controllers 20 and 21 should be placed at an input side of each of the inphase and the quadrature analog-to-digital converters 15 and 16 rather than at an output side of each of the inphase and the quadrature digital filters 17 and 18.

What is claimed is:

1. A demodulator for use as a counterpart of a multilevel quadrature amplitude modulator for modulating a main data signal into a multilevel quadrature amplitude modulated signal, said demodulator being for demodulating said multilevel quadrature amplitude modulated signal into an inphase demodulated signal and a quadrature demodulated signal, said demodulator comprising:

a processing unit supplied with said multilevel quadrature amplitude modulated signal for processing said multilevel quadrature amplitude modulated signal into inphase and quadrature processed signals, said inphase processed signal having an inphase signal phase, said quadrature processed signal having a quadrature signal phase;

an in-phase phase controller supplied with said inphase and said quadrature processed signals and an inphase control signal for controlling said inphase signal phase to produce an inphase phase controlled signal as said inphase demodulated signal, said inphase phase controlled signal comprising an inphase data signal and an inphase error signal;

a quadrature phase controller supplied with said inphase and said quadrature processed signals and a quadrature control signal for controlling said quadrature signal phase to produce a quadrature phase controlled signal as said quadrature demodulated signal, said quadrature phase controlled signal comprising a quadrature data signal and a quadrature error signal;

a first multiplier connected to said inphase and said quadrature phase controllers for multiplying said inphase error signal by said quadrature data signal to supply a first multiplied signal to said inphase phase controller as said inphase control signal; and a second multiplier connected to said inphase and said quadrature phase controllers for multiplying said quadrature error signal by said inphase data signal to supply a second multiplied signal to said quadrature phase controller as said quadrature control signal.

2. A demodulator as claimed in claim 1, wherein said processing unit comprises:

a quadrature phase detector supplied with said multilevel quadrature amplitude modulated signal for detecting said multilevel quadrature amplitude modulated signal to produce inphase and quadrature baseband signals;

an inphase low-pass filter connected to said phase detector for filtering said inphase baseband signal to produce an inphase filtered signal;

a quadrature low-pass filter connected to said phase detector for filtering said quadrature baseband signal to produce a quadrature filtered signal;

an inphase analog-to-digital converter connected to said inphase low-pass filter for converting said inphase filtered signal to an inphase converted signal;

a quadrature analog-to-digital converter connected to said quadrature low-pass filter for converting said quadrature filtered signal to a quadrature converted signal;

an inphase digital filter connected to said inphase analog-to-digital converter for filtering said inphase converted signal to produce an inphase digital filtered signal as said inphase processed signal; and a quadrature digital filter connected to said quadrature analog-to-digital converter for filtering said quadrature converted signal to produce a quadrature digital filtered signal as said quadrature processed signal.

3. A demodulator as claimed in claim 1, wherein said inphase phase controller comprises:

an inphase logical process circuit supplied with said inphase control signal for producing first and second inphase function signals representing first and second variable inphase values;

a first inphase multiplier connected to said inphase logical process circuit and supplied with said inphase processed signal and said first inphase function signal for multiplying said inphase signal phase by said first variable inphase value into a first inphase multiplied value to produce a first inphase multiplied signal representative of said first inphase multiplied value;

a second inphase multiplier connected to said inphase logical process circuit and supplied with said quadrature processed signal and said second inphase function signal for multiplying said quadrature signal phase by said second variable inphase value into a second inphase multiplied value to produce a second inphase multiplied signal representative of said second inphase multiplied value;

an in-phase adder connected to said first and said second inphase multipliers for calculating an inphase sum of said first and said second inphase multiplied values to produce, as said inphase demodulated signal, an inphase sum signal representative of said inphase sum.

4. A demodulator as claimed in claim 1, wherein said quadrature phase controller comprises:

a quadrature logical process circuit supplied with said quadrature control signal for producing first and second quadrature function signals representing first and second variable quadrature values;

a first quadrature multiplier connected to said quadrature logical process circuit and supplied with said quadrature processed signal and said first quadrature function signal for multiplying said quadrature signal phase by said first variable quadrature value into a first quadrature multiplied value to produce a first quadrature multiplied signal representative of said first quadrature multiplied value;

a second quadrature multiplier connected to said quadrature logical process circuit and supplied with said inphase processed signal and said second quadrature function signal for multiplying said inphase signal phase by said second variable quadrature value into a second quadrature multiplied value to produce a second quadrature multiplied signal representative of said second quadrature multiplied value; and a quadrature subtracter connected to said first and said second quadrature multipliers for calculating a quadrature difference between said first and said second quadrature multiplied values to produce, as said quadrature demodulated signal, a quadrature difference signal representative of said quadrature difference.

5. A demodulator as claimed in claim 3, wherein said inphase logical process circuit comprises:

an additional inphase adder supplied with an inphase additional signal and said inphase control signal for calculating an inphase accumulation of said inphase additional signal and said inphase control signal to produce an inphase accumulated signal representative of said inphase accumulation;

an inphase delay means connected to said additional inphase adder for delaying said inphase accumulated signal to produce an inphase delayed signal as said inphase additional signal;

a first inphase function signal generator supplied with said inphase accumulated signal for generating said first inphase function signal with said first variable inphase value determined by said inphase accumulation; and a second inphase function signal generator supplied with said inphase accumulated signal for generating said second inphase function signal with said second variable inphase value determined by said inphase accumulation.

6. A demodulator as claimed in claim 4, wherein said quadrature logical process circuit comprises:

an additional quadrature adder supplied with a quadrature additional signal and said quadrature control signal for calculating a quadrature accumulation of said quadrature additional signal and said quadrature control signal to produce a quadrature accumulated signal representative of said quadrature accumulation;

a quadrature delay means connected to said additional quadrature adder for delaying said quadrature accumulated signal to produce a quadrature delayed signal as said quadrature additional signal;

a first quadrature function signal generator supplied with said quadrature accumulated signal for generating said first quadrature function signal with said first variable quadrature value determined by said quadrature accumulation; and a second quadrature function signal generator supplied with said quadrature accumulated signal for generating said second quadrature function signal with said second variable quadrature value determined by said quadrature accumulation.

* * * * *